Patented Jan. 3, 1933

1,893,008

UNITED STATES PATENT OFFICE

LASZLO WAMOSCHER, OF BERLIN-WILMERSDORF, GERMANY, ASSIGNOR TO FIRM LONZA ELEKTRIZITAETSWERKE UND CHEMISCHE FABRIKEN, A. G., OF BASEL, SWITZERLAND

METHOD AND MEANS FOR PREVENTION OF METALDEHYDE POISONINGS

No Drawing. Application filed May 29, 1931, Serial No. 541,103, and in Germany May 31, 1930.

This invention relates to fuel tablets consisting of metaldehyde, and particularly to means for preventing poisoning thereby.

It has been found that this fuel, which is put on the market and distributed in the form of solid white tablets consisting of polymers of acetaldehyde, is often taken into the mouth and eaten, especially by children, since its appearance is much like that of sugar. Thereby the metaldehyde undergoes depolymerization and causes severe poisoning often with lethal effect.

The object of the present invention is to prevent such accidental poisoning by providing the fuel tablets with a substance causing such disagreeable, biting, burning, irritating effect on the mucous membranes of the mouth, etc., that the child is thereby impelled to instantly remove the tablet from his mouth, and usually expels it by an ejection-reflex.

It has been proposed already to provide poisonous pharmaceutical and chemical tablets and pills, particularly such as are used for germicidal purposes, with a coating of bitter or repulsive tasting substance, such for instance as bitter aloes. However, bitter aloe has many disadvantages in this respect. First of all, the effect of this substance, and of bitter tasting substances in general, is that, even when used in strong concentration, the ejection-reflex is not very intense, so that many people, especially children, would not react to this effect sufficiently to prevent poisoning. Moreover, the bitter tasting substances are easily soluble in water and are deliquescent, and thus their concentration continually decreases, by absorption of the moisture in the air as they stand, so that their effect becomes the weaker the longer the tablets are stored. Furthermore, particularly in connection with fuel tablets of metaldehyde, the known substances have the great disadvantage that they would cause stabilization of the fuel whereby its combustibility is altered very unfavorably.

According to the present invention, all these drawbacks are avoided by providing "fuel-tablets", consisting chiefly of metaldehyde, with a protective coating of a substance belonging to the capsaicin group, and particularly with capsaicin:

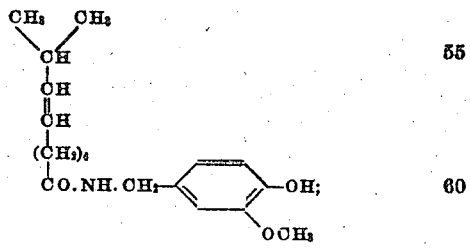

or with synthetically produceable substances chemically related to capsaicin, such as the oxybenzylamides of fatty acids.

I have found that these substances have a strong, burning and biting effect on mucous membranes and cause an immediate, irresistible impulse to eject the tablet from the mouth. Indeed, they set up an ejection-reflex. Moreover, I have found that they are chemically quite neutral, and that they neither cause any chemical alteration in the fuel nor suffer any such alteration themselves by close contact with it. This feature is particularly important because in the course of the last few years, nearly every repulsive tasting substance known has been tried as a protective medium for fuels consisting of metaldehyde, and it has been found that all these known or proposed substances, cause depolymerization of the fuel or impair its combustibility. Finally, I have found that the substances of the capsaicin group are soluble in water only just appreciably, so that their concentration and their effect is not decreased even by storing the tablets for a long time in moist atmosphere.

Though the general physiological effect of capsaicin on mucous membranes has been known for some time, this quality, however important it may be for the present purpose, is not decisive in itself, as there are a great many substances having the same irritating quality which nevertheless cannot be used in connection with fuels consisting of metaldehyde. For this special purpose, I have discovered that the protective substance must have all the qualities above named, and as a result of my comprehensive researches and experiments with various substances, it is my discovery that there are no other substances but these of the capsaicin group which could be used as a protective medium for fuels consisting of metaldehyde.

The fuel tablets may be provided with the protective medium either by smearing, soaking or impregnating it therewith. To secure good adhesion of the protective substance to the tablet, it is advantageous to mix it with media enhancing the adherence, such as nitrocellulose or acetylcellulose.

I claim:

1. A fuel tablet, comprising metaldehyde and a substance of the capsaicin group.

2. A fuel tablet, comprising metaldehyde and C. P. capsaicin.

3. A fuel tablet comprising metaldehyde and a synthetic oxybenzilamide of a fatty acid.

4. A fuel tablet comprising metaldehyde; and a mixture of a substance of the capsaicin group with nitrocellulose.

5. A fuel tablet, comprising metaldehyde; and a mixture of a substance of the capsaicin group with acetylcellulose.

In testimony whereof I affix my signature.

LASZLO WAMOSCHER.